United States Patent Office
3,718,523
Patented Feb. 27, 1973

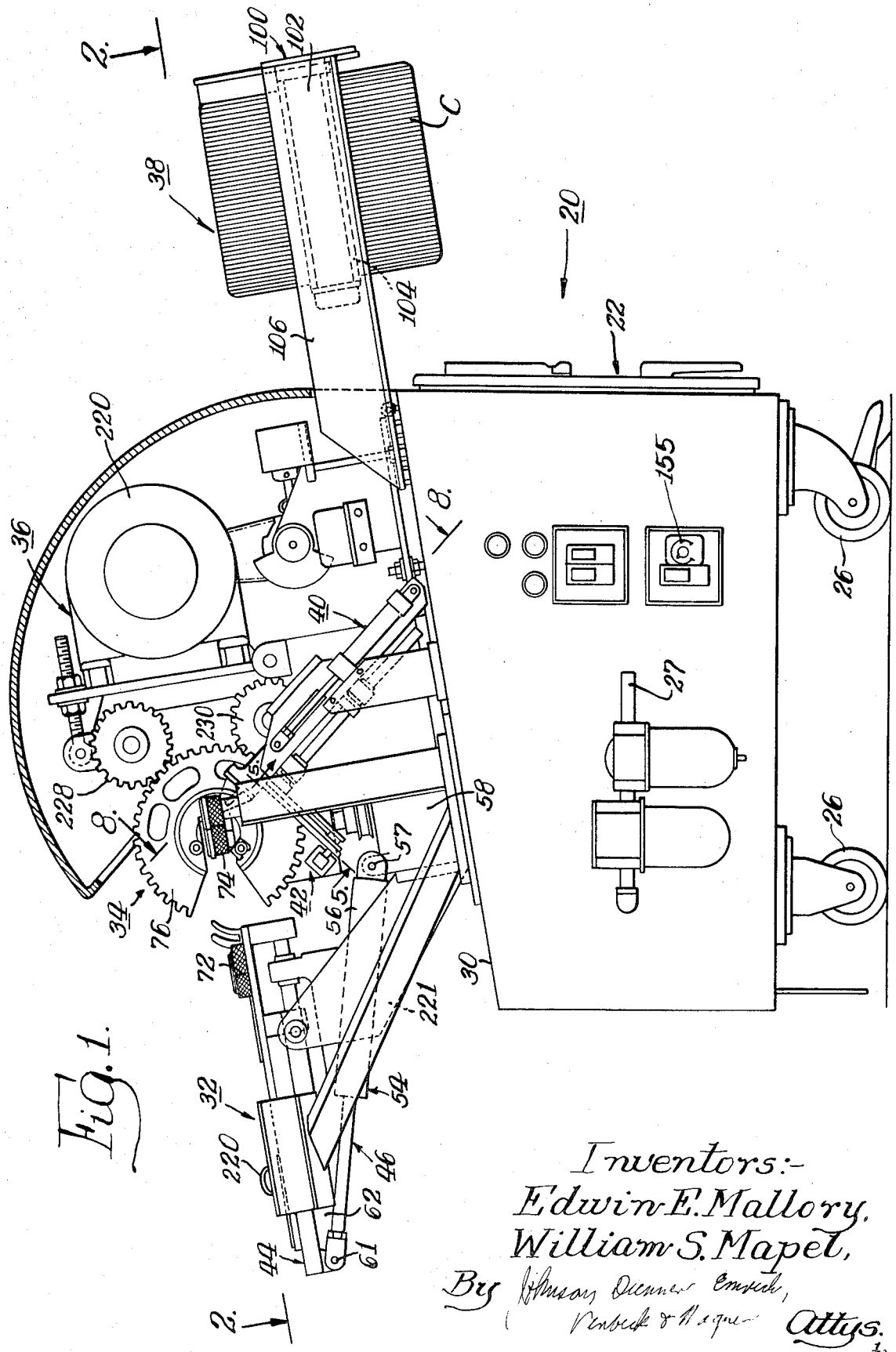

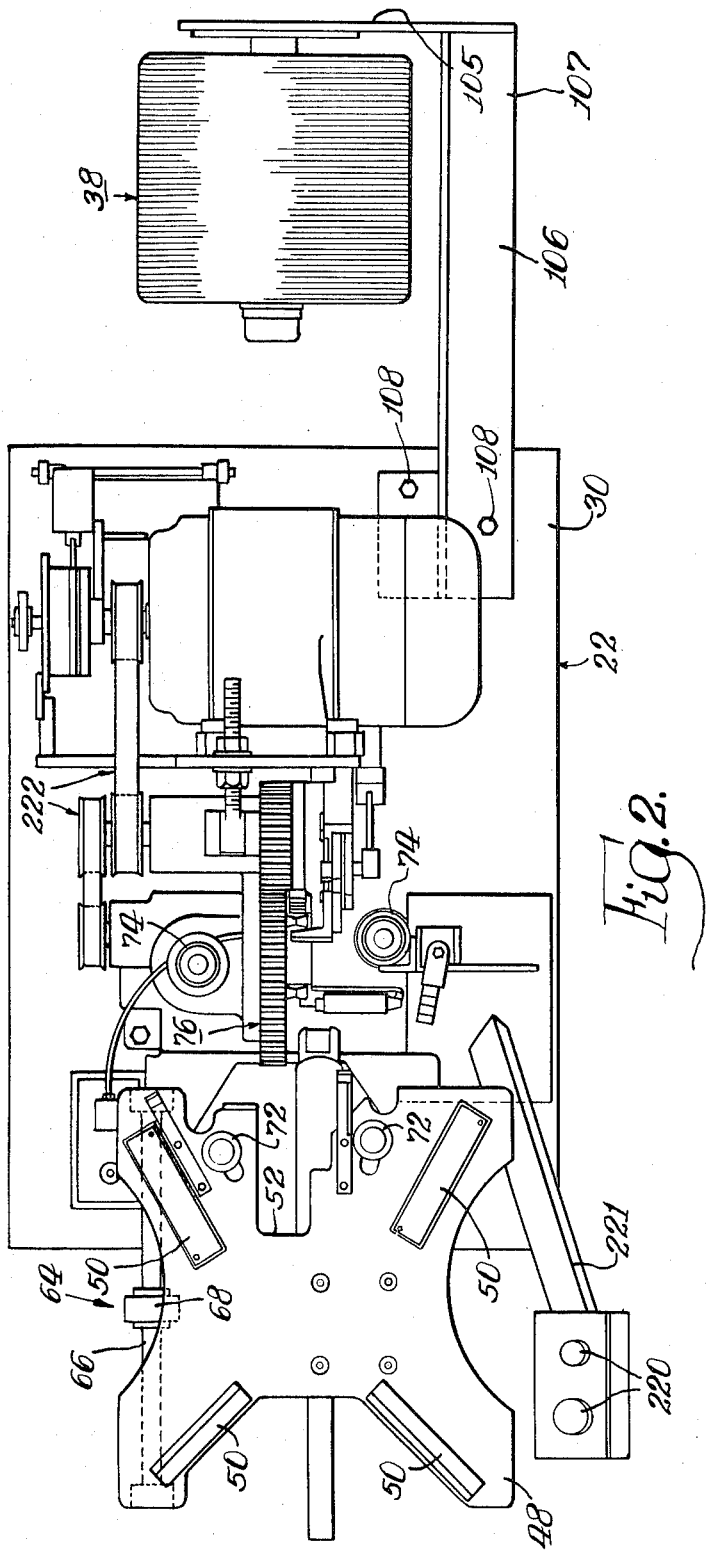

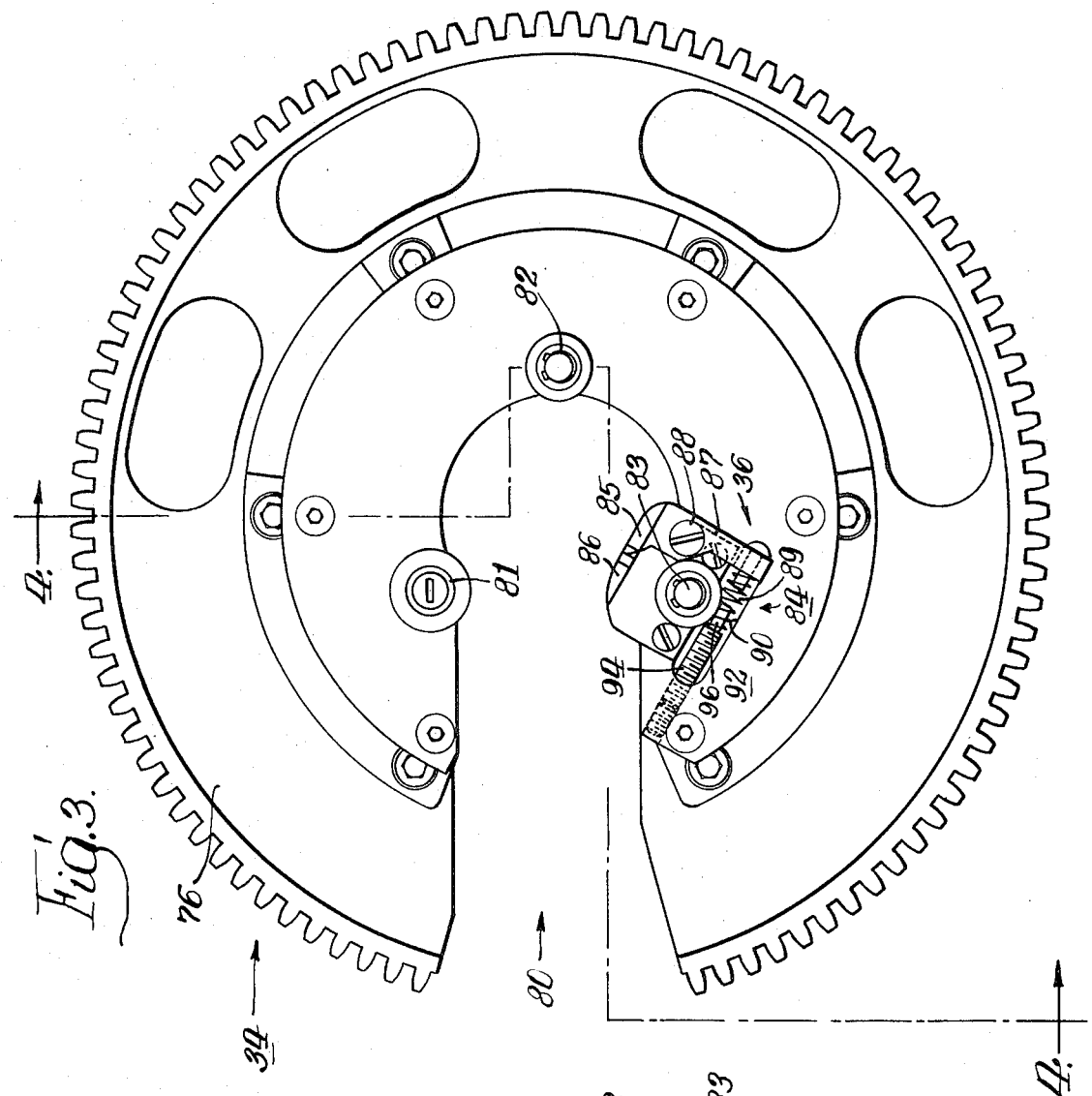
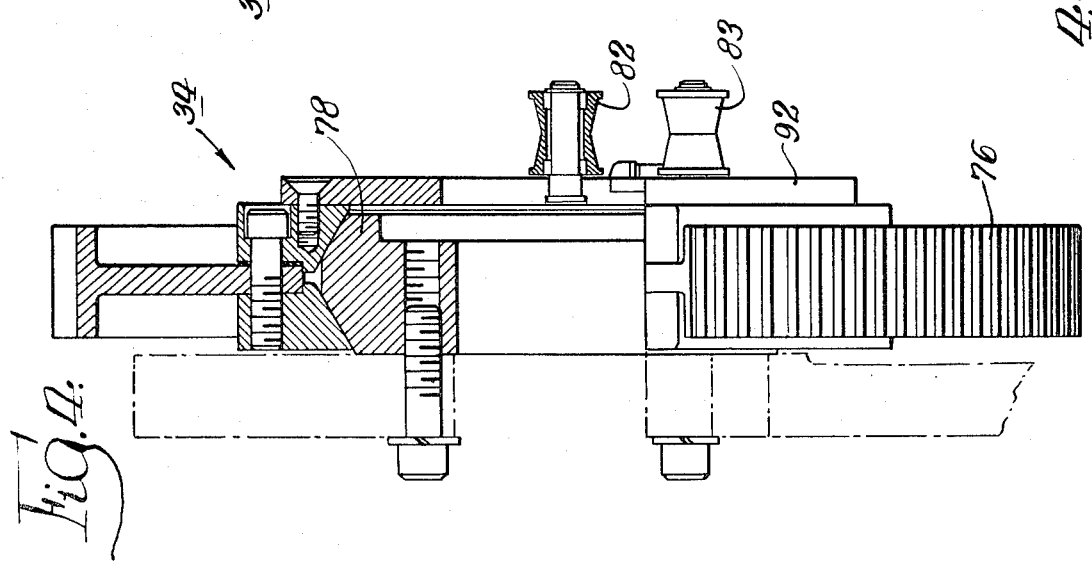

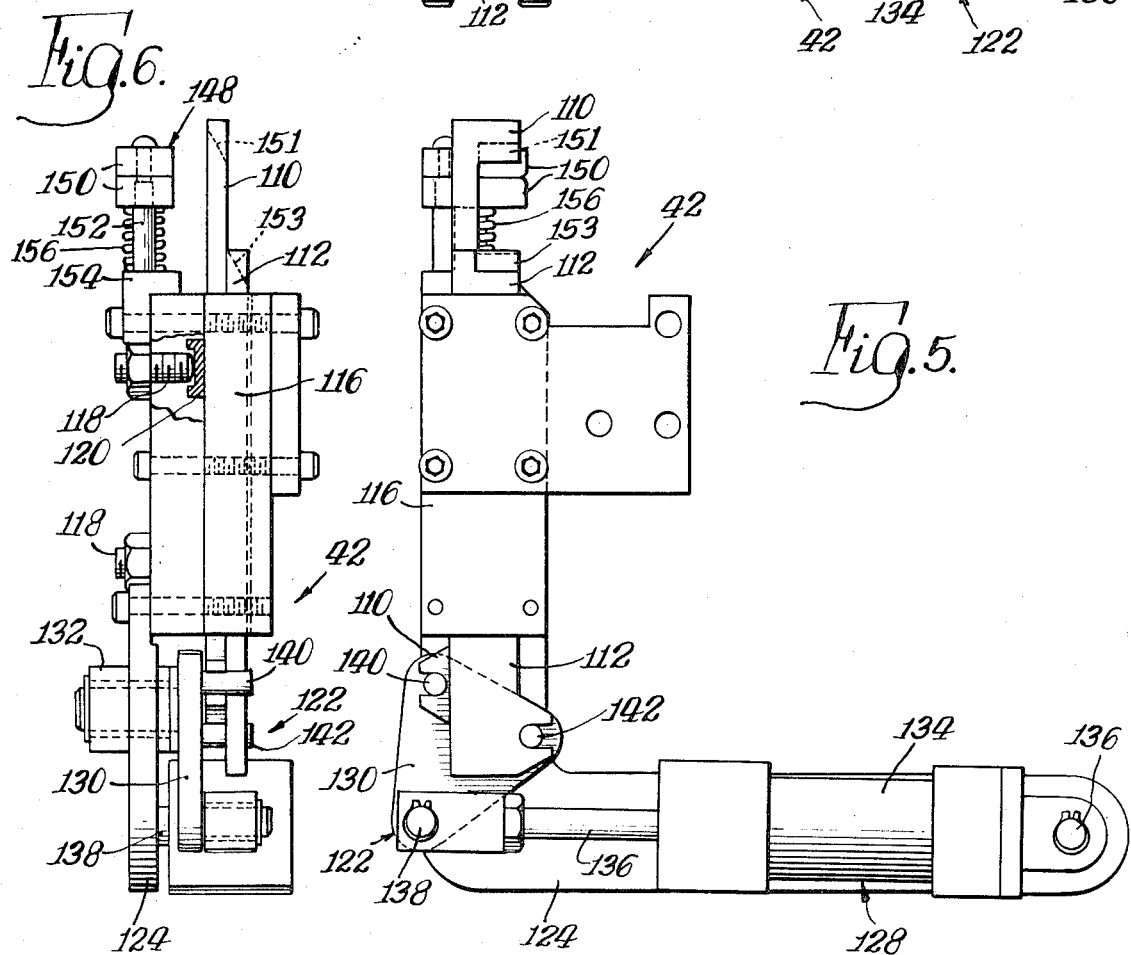

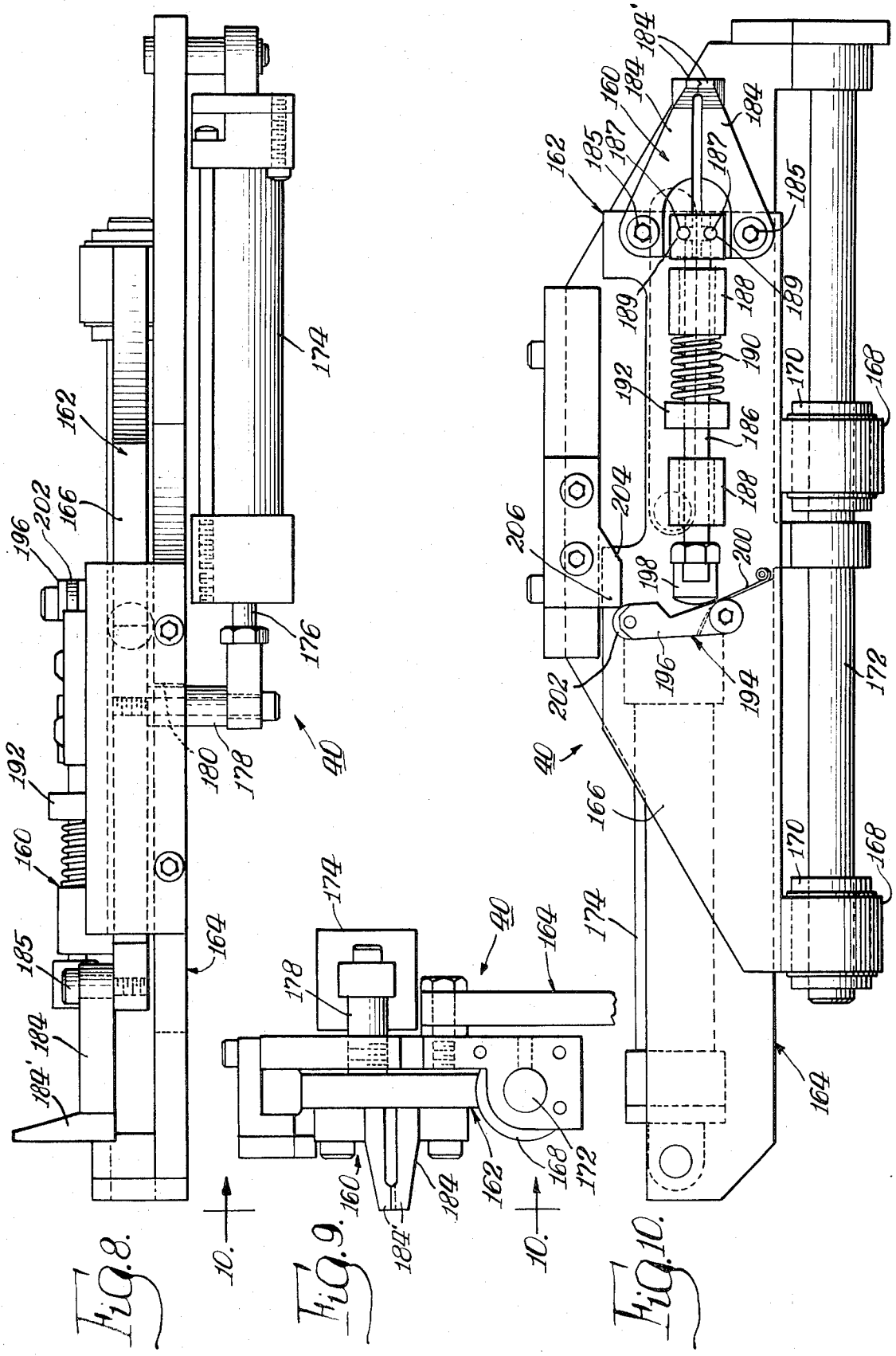

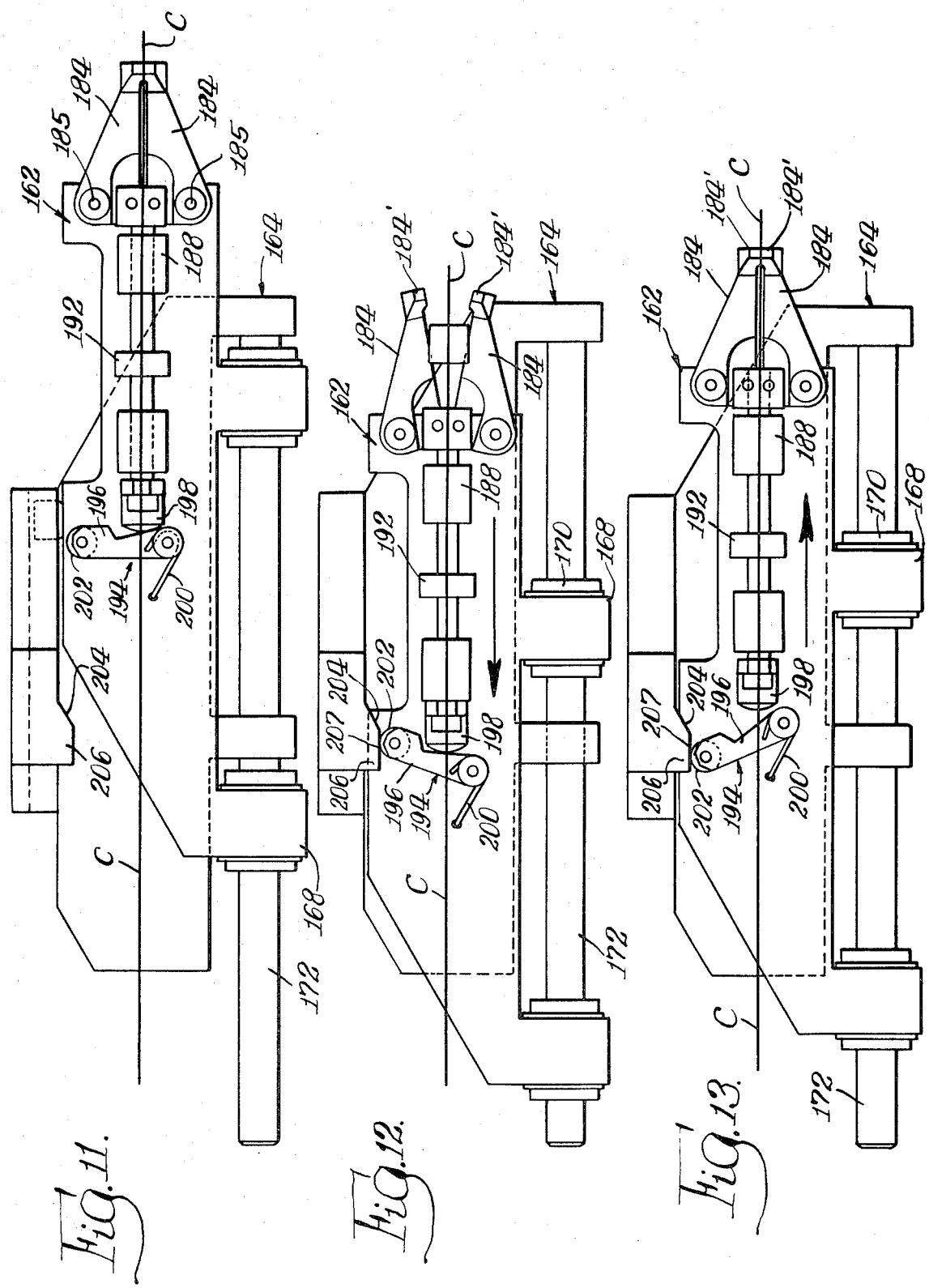

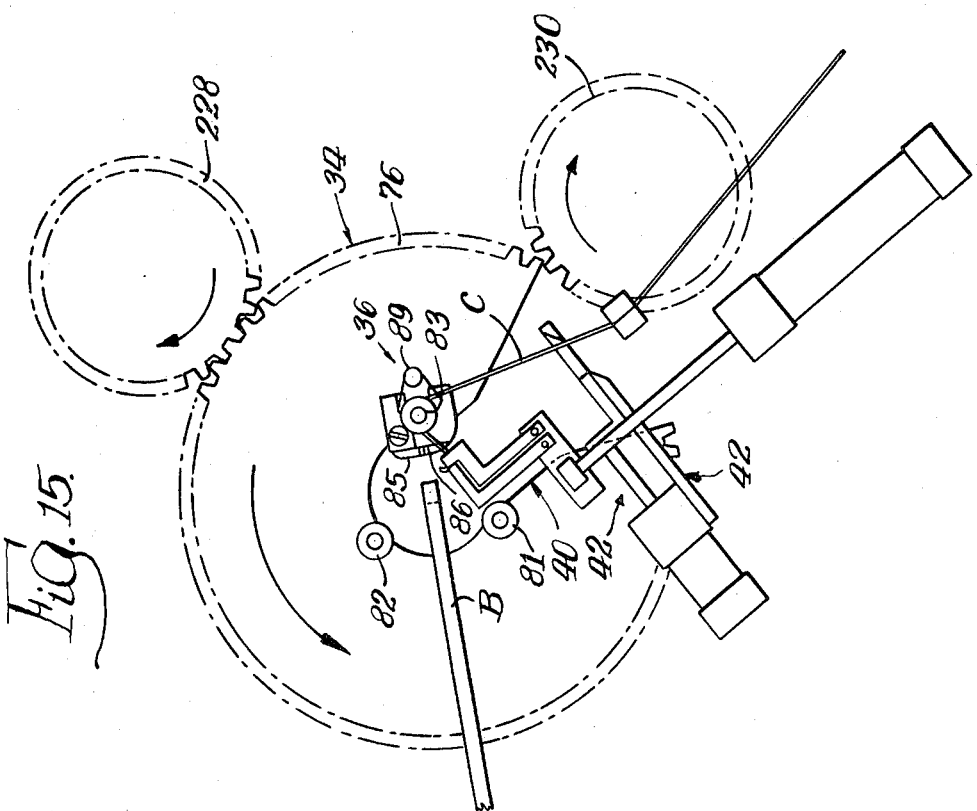
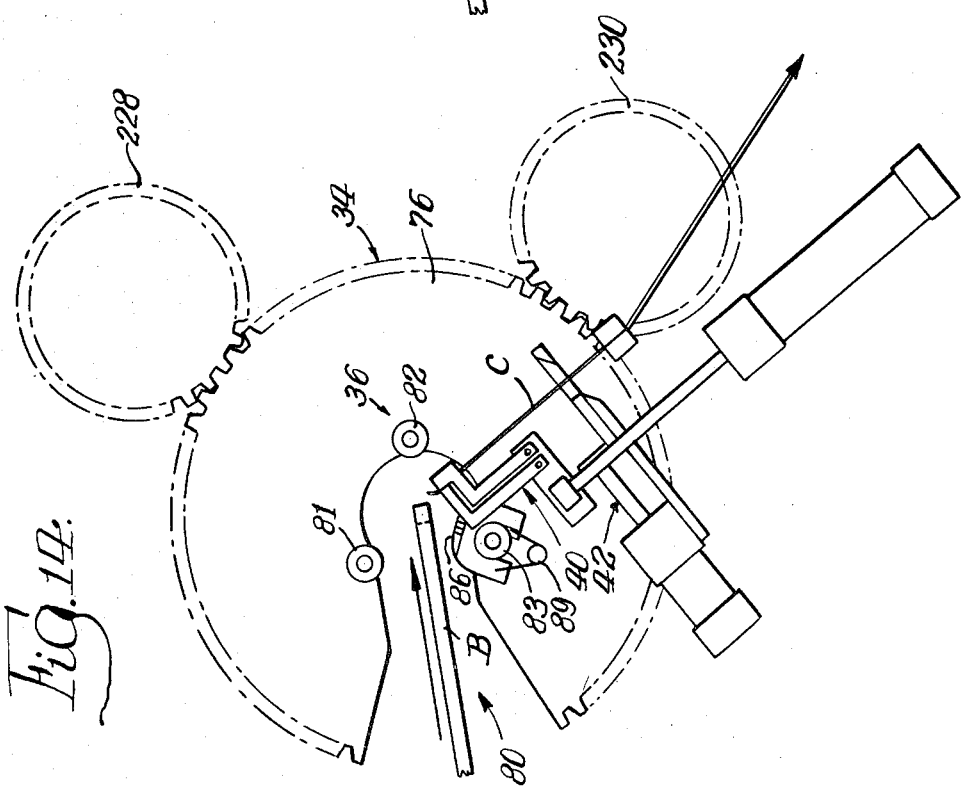

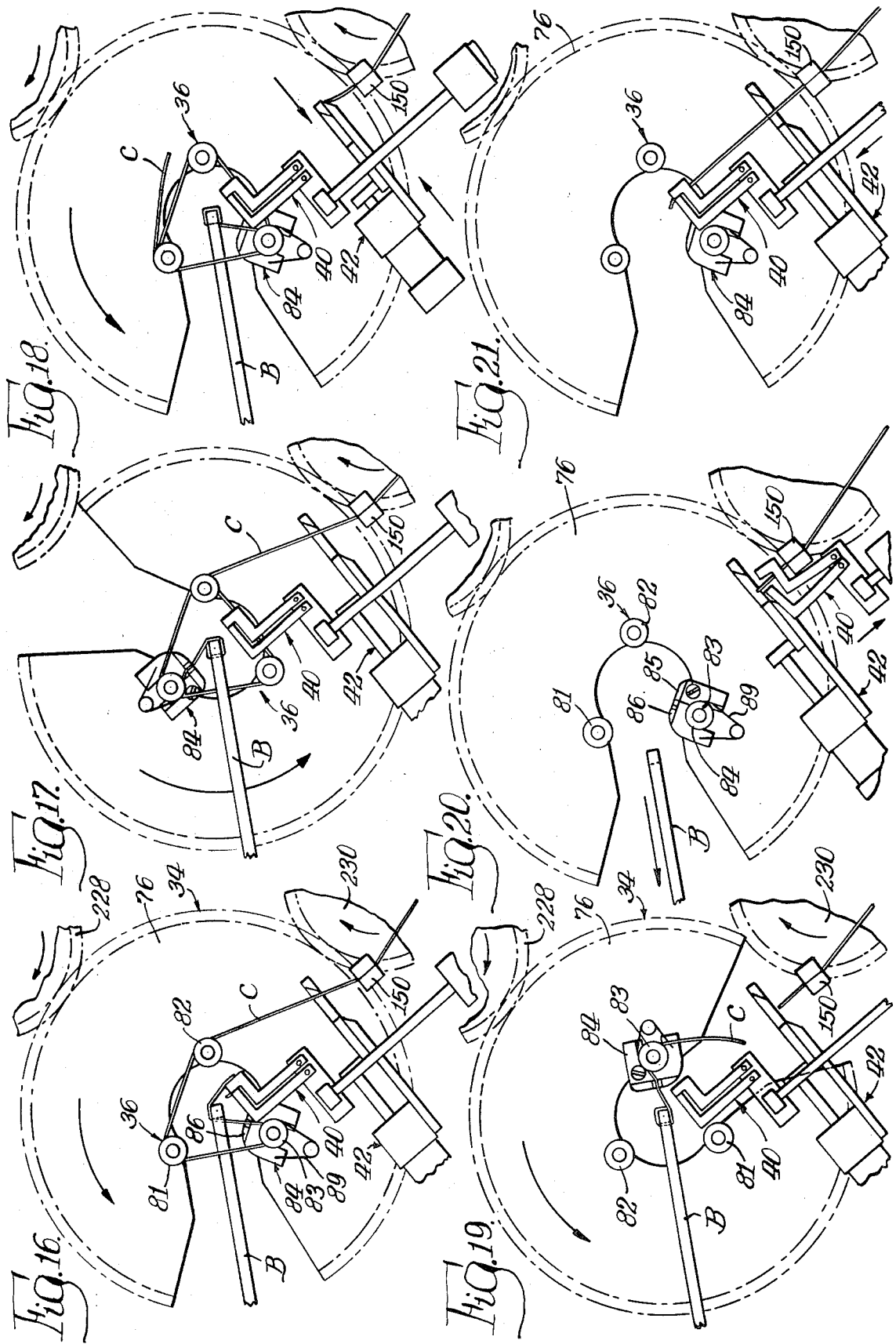

3,718,523
TIRE BEAD WRAPPING MACHINE
Edwin E. Mallory and William S. Mapel, Niles, Mich.,
assignors to National-Standard Company, Niles, Mich.
Filed Apr. 21, 1971, Ser. No. 135,970
Int. Cl. B29h 7/22, 17/34
U.S. Cl. 156—460                                14 Claims

ABSTRACT OF THE DISCLOSURE

A tire bead wrapping machine designed to automatically feed the cord to the shuttle from a spool mounted remote from the shuttle. A cord feeding assembly uses a pair of gripping fingers to bring the end of the cord to a cord feeding position adjacent one side of the shuttle, from which position the free end is picked up by the accumulator assembly at the start of a bead wrapping cycle. The excess cord is stored on the accumulator spools as the shuttle rotates about the bead. When a sufficient length of cord for one wrapping cycle is removed from the spool, a cord cutting assembly severs the cord and holds the free end of the cord coming from the spool, which free end is gripped by the gripping fingers and conveyed to the cord feeding position to prepare the machine for the next bead wrapping cycle.

BACKGROUND OF THE INVENTION

This invention relates to wrapping machines and in particular to machines designed to wrap the beads used in the manufacture of tires for motor vehicles.

Most present spiral wrapping machines utilize small spools of cord carried on a rotating shuttle which rotates about the bead's cross section. There are several disadvantages to this arrangement. One major deficiency is caused by continual reduction in mass of the cord on the spool with the deleterious result of unbalancing the shuttle. This unbalanced load causes machine vibrations with resulting high maintenance cost. To bring the unbalance within tolerable limits, the shuttle speed is lowered and consequently limits the minimum wrap time. Also, because the cord spool must be kept to a minimum size to avoid large variations in its mass, the cord supply is required to be frequently replaced.

This invention avoids the aforementioned disadvantages by feeding the cord from a cord spool located off the shuttle, and having no parts of varying weight on the shuttle.

SUMMARY OF THE INVENTION

An improvement in a tire bead wrapping machine for wrapping a tire bead that uses several cooperating assemblies to automatically feed a cord to the shuttle from a stationary spool mounted remote from the shuttle. A cord feeding assembly delivers the end of the spool of cord to a position adjacent the shuttle, where at the start of the bead wrapping cycle it is introduced into an accumulator assembly carried by the shuttle. Excess cord is stored in the accumulator assembly as the shuttle rotates about the bead. When sufficient cord is pulled from the spool to complete a bead wrapping cycle, a cord cutting assembly severs the cord and holds the end of the cord extending from the spool. At the end of the bead wrapping cycle, the cord feeding assembly picks up the free end of the spool and conveys it to a position adjacent the shuttle for the next bead wrapping cycle.

DESCRIPTION OF THE DRAWING

For a better understanding of this invention, reference may be had to the accompanying drawings in which:

FIG. 1 is a side elevation view of a machine for wrapping tire beads embodying the principles of the present invention;

FIG. 2 is a top view of the machine depicted in FIG. 1 taken along the lines 2—2 of FIG. 1;

FIG. 3 is a side view of the shuttle and accumulator assembly used with the machine of FIG. 1;

FIG. 4 is a partial sectional view and partial front view of FIG. 3 taken along the line 4—4 of FIG. 3;

FIG. 5 is a view of the cord-cutting assembly used with the machine of FIG. 1 and taken along the line 5—5 of FIG. 1;

FIGS. 6 and 7 are, respectively, the side and top views of the cutter assembly shown in FIG. 5;

FIG. 8 is a view of the cord-feeding assembly used in the machine of FIG. 1 and taken along the line 8—8 of FIG. 1;

FIG. 9 is a view of the cord-cutting assembly of FIG. 8, taken from its left side and rotated counterclockwise 90 degrees;

FIG. 10 is a plan view of the cord-cutting assembly taken along the line 10—10 of FIG. 9;

FIGS. 11, 12 and 13 are, respectively, three views of the cord-cutting assembly of FIGS. 8 through 10 illustrating the relative position of its parts as it is retracted at the end of a bead-wrapping cycle to advance the end of the cord to the shuttle for the next bead-wrapping cycle; and FIGS. 14 through 21 diagrammatically illustrate the relative positions of the shuttle gear assembly, the drive gear assembly, the cord-feeding assembly, the cord-accumulator assembly, and the cord-cutting assembly as the head wrapper machine moves through a bead-wrapping cycle.

DESCRIPTION OF PREFERRED EMBODIMENT

Referring to FIGS. 1 and 2 there is shown a spiral bead wrapper machine, embodying the principles of this invention and generally designated by the reference numeral 20. The machine is assembled on a cabinet 22, which is made movable by virtue of four rubber-tired casters 26. A hose from a source of pressurized air is connected to conduit 27 extending from the side of cabinet 22 to supply air under pressure to the various piston and cylinder units used in this invention.

The cooperating assemblies of the bead wrapping machine 20 are supported by the top surface 30 of the cabinet 22 and comprise: bead table assembly 32, shuttle assembly 34, accumulator assembly 36, cord storage assembly 38, cord feeding assembly 40, and cord cutting assembly 42.

The bead table assembly 32 comprises a bead table 44 adapted to support the tire beads during the wrapping operation and a bead table positioning mechanism 46 for moving the bead table 44 between the extended position (shown in FIGS. 1 and 2) and the wrapping position. The bead table 44 has a generally flat platform 48 (FIG. 2) on which are mounted four diagonal skids 50 disposed at approximately 90 degree relation with the adjacent skids for supporting the tire bead at four approximately equally spaced points. The skids 50 are preferably made of a low friction material to reduce the frictional resistance as the tire beads are slid across their top surfaces. A deep cut-out 52 is provided in the forward head of the platform 48 to accommodate the shuttle assembly 34.

The bead table positioning mechanism 46 (FIG. 1) comprises a piston and cylinder unit 54 acting between a stationary point at the base of the shuttle gear assembly 34 and a point at the rear of the bead table 44. The cylinder 56 of the piston and cylinder unit 54 is pivotally coupled at 57 to a block 58 directly below the shuttle gear assembly 34, and the outer end of the piston rod 60 is pivotally connected at 61 to the rearmost end of a drive bar 62 which is secured to the bottom surface of the platform 48 along its approximate centerline and extends towards the shuttle gear assembly 34. To guide the bead table 44 toward and away from the shuttle gear assembly 34, a platform guide unit 64 (FIG. 2) is provided comprising a cylindrical guide rail 66 supported below the bottom surface of the platform 48 on one side of the platform 48 (see FIG. 2) in a parallel relationship with the guide bar 62 and guide rail 66 extends through a guide bushing 68 which is supported by a frame member (not shown) whose lower end is mounted on the support block 58.

Disposed on opposite sides of the cut-out 52 are a pair of bead follower rollers 72, which cooperate with a pair of bead drive rollers 74 to function as bead driving means and turn the tire beads in a conventional manner. The tire beads are placed over the bead follower rollers and as the bead table assembly 32 is brought into operating relation with the shuttle gear assembly, the tire beads are held between the bead follower rollers 72 and the bead drive rollers 74.

Referring to FIGS. 3 and 4, there is shown a shuttle assembly 34 comprising a gear 76 mounting on a bearing 78. The shuttle gear 76 and bearing 78 have corresponding arcuate segments removed to define a throat 80 for providing an entrance way for the tire beads.

Supported on the bearing 78 of the shuttle assembly 34 is the accumulator assembly 36 comprising three radially spaced bobbins 81, 82 and 83 and cord tensioning device 86. The cord tensioning device 84, which is mounted at the base of bobbin 83, uses a pair of opposing spring-loaded jaws 85 and 86 to engage and grip the cord passing therethrough. Jaw 85 is formed at one end of a lever 87 pivotally mounted on pin 88 and is urged against jaw 86 by means of tension spring 89, which constantly pushes against the other end of lever 87. Tension spring 89 is contained in a bore 90 formed through the side of plate 92 (FIG. 4) and its spring force can be adjusted by turning set screw 94 to move pin 96 inwardly or outwardly along bore 90. As will be explained in complete detail hereinafter, the cord is automatically introduced between the spring-loaded jaws 85–86 and wraps around the three bobbins 81–83 during the initial rotations of the shuttle assembly 34.

Located at the rear of the bead wrapping machine is the cord storage assembly 38, as shown in FIGS. 1 and 2. The spool of cord "C" is formed on a cardboard cylinder 104 and is rotatably mounted on mandrel 102 of spoolholder 100, secured to one leg 105 of an L-shaped bracket member 106, and the other leg 107 is fastened to the top wall 30 of the cabinet 22 by threaded bolts 108. By having the spool located in a position remote from the shuttle assembly 34, it is possible to use a very large spool of cord in the order of 25 pounds or more to provide uninterrupted wrapping for a long period of time. This is a great advantage over the prior art cord wrapping machines which are limited in the amount of spool due to the fact that the spool is located on the shuttle gear. The cord "C" is fed off the spool and passes from the rear of machine 20 through suitable guide and tension devices to the cord cutting assembly 42 at the forward end of the machine 20.

Referring to FIGS. 5–7, the cutter assembly 42 uses two slidably mounted blades 110 and 112 which are operated conjointly to sever the cord in a scissors-type cutting action. The blades 110, 112 extend through a rectangular shaped opening 114, which is formed lengthwise in a housing 116, and the blades are urged in sliding contact by two spring plungers 118 which bias a pair of tension pads 120 (FIG. 6) against the side surface of blade 110.

To operate the blades 110, 112, a cutter operating mechanism 122 is provided, which is assembled on L-shaped mounting bar 124. Cutter operating mechanism 122 comprises a piston and cylinder unit 128 and a triangular-shaped plate 130, which is pivotally mounted to the L-shaped mounting bar 124 by means of bushing 132 (FIG. 6). The cylinder 134 of the piston and cylinder unit 128 is mounted by pin 136 to the mounting bar 124 and the piston rod 136 is pivotally mounted on mounting bar 124 by pin 138 adjacent to one vertex of the triangular plate 130. A pair of driving pins 142, 144 extend from the surface of the triangular plate 130 at the other two vertexes and engage in a driving relation with the blades 110 and 112, respectively, by extending through their respective slots 144 and 146 formed laterally at their lower ends.

Referring to FIG. 5, it will be appreciated that when the piston rod 136 is extended, the triangular plate 130 is rotated counter-clockwise about the bushing 132 to thereby cause, respectively, the cutters 110 and 112 to be brought downwardly and upwardly from the positions shown in FIG. 5. As the blades 151 and 153 of their respective cutters 110 and 112 cross, they sever the cord extending between them.

Piston and cylinder unit 128 is energized by an electronic timing relay that operates an electric solenoid valve when sufficient cord has been unreeled to complete a wrapping cycle. The amount of course varies with different size tire beads, and each time the bead size is changed, it is necessary for the machine operator to change the calibrated dial 155 (FIG. 1) on the side of cabinet 22 to the appropriate size. The control device could be either any of a number of commercially available counters that would measure the number of revolutions made by the shuttle or commercially available timers that are set to actuate in response to the length of time it takes to complete a wrapping cycle.

To hold the end of the bead wrapping cord extending from the spool after the cord has been cut, a cord holding device 148 is provided on the cutter assembly. The cord holding device 148 has a pair of opposing tension pads 150 slidably mounted on an upright pin 152, which is supported from a block 154 fastened to the rear of housing 116, and the tension pads are maintained in engaging relationship by a compression spring 156 disposed between the lowermost of the tension pads and the block 154. As clearly depicted in FIG. 6, the centerline between the tension pads 150 is disposed along a horizontal plane that extends through the cutter throat of cutters 110, 112.

Referring to FIGS. 8, 9 and 10, there is illustrated the cord feeding assembly 40 which introduces the end of the cord into the shuttle assembly 34 at the start of each bead-wrapping operation. The cord feeding assembly 40 comprises a finger feed mechanism 160 carried on a slide unit 162, which is slidably mounted on a stationary base member 164. The slide unit 162 is constructed as a flat plate 166 having a pair of retaining rings 168 secured to its upper surface in a spaced relation. In each retaining ring 168 is a ball bushing 170 which is slidably mounted on a guide rod 172 of the base member 164.

The slide unit 162 is driven forwardly and rearwardly along the guide rod 172 by means of a piston and cylinder unit 174 (FIG. 8). The piston and cylinder unit 174 is mounted on the side opposite to the slide unit 162 and its piston rod 176 is interconnected to the plate 166 by virtue of a coupler pin 178 extending crosswise through an elongated slot 180 formed in base member 164.

The finger feed mechanism 160 comprises a pair of opposing gripping fingers 184 pivotally mounted on plate 166 by pivot pins 185. The jaws 187 of the gripping fingers are opened and closed by the reciprocal movement of actuator pin 186 by virtue of the driving cooperation between two pins 187 carried on the forward end of actuator pin 186 and two slots 189 formed in the inner ends of gripping fingers 184. Actuator pin 186 is slidably mounted through a pair of spaced bushings 188 secured to flat plate 166. The gripping fingers are biased in the closed gripping position by virtue of a compression spring 190 disposed about the actuator pin 186 between one of the bushings 188 and a clamp collar 192 fixed to the actuator pin 186. Consequently, when the actuator pin is driven to the right as viewed in FIG. 10, with sufficient force to overcome the resistance of compression spring 190, the pair of gripping fingers 184 spread apart.

The finger feed mechanism 160 is operated by an actuating device 194 causing the pair of fingers 184 to spread open as the slide unit 162 moves to the right as viewed in FIG. 9. The actuating device 194 employs an actuator lever 196 pivotally mounted on plate 166 with its intermediate portion disposed to engage the dowel pin 198 mounted on the end of actuator pin 186. The actuator lever 196 is biased toward the dowel pin 198 by virtue of a torsion spring 200 having its fixed end secured to the plate 166 and its free end urging the actuating lever to rotate clockwise, as viewed in FIG. 10. The lower end of actuator lever 196 carries a hardened roller 202 which is caused to ride up the ramp 204 of a cam 206 carried by the base member 164 as the slide unit 162 is driven from right to left.

Referring to FIGS. 11, 12 and 13, there is illustrated in sequence the operation of the finger feed mechanism 160. In FIG. 11, the finger feed mechanism 160 is depicted with the slide unit 162 in the fully extended position and the pair of gripping fingers 184 holding the cord "C" adjacent to the shuttle assembly 34. In FIG. 12, the piston and cylinder unit 174 has partially retracted the slide unit 162 towards the left such that the roller 202 of the actuator lever 196 has ridden up the ramp 204 of the cam 206 and is riding along its top surface 207, causing the actuator pin 186 to be displaced towards the right to thereby spread apart the jaws 187 of gripping fingers 184. The slide unit 162 continues to move to the left allowing the roller 202 of actuator arm 196 to roll off the upper cam surface 207 and free the actuator pin 186 with the result that the gripping fingers return to the closed position under the biasing force of compression spring 190. The direction of slide unit 162 is then reversed, pulling the cord "C" with it as depicted in FIG. 13. When returning to the extended position the actuator lever 196 again rides over the cam surfaces of cam 206, but does not cause the actuation of actuator pin 186 since it rotates counterclockwise away from pin 186.

Referring to FIGS. 1 and 2, there is shown an electric motor 220 which is the prime mover for the bead-wrapping machine 20, and synchronously drives the bead drive rollers 74 and the two shuttle drive gears 228 and 230 by means of a series of timing belts generally designated by the reference numeral 222. The two shuttle drive gears 228, 230 are spaced about the perimeter of the shuttle gear 76 and separated by a distance greater than the throat opening 80 of the shuttle assembly 34. The shuttle drive gears 228 and 230 are synchronously driven in the same direction of rotation so that they alternately demesh and remesh as the segmented part of the shuttle gear 76 passes them.

Because the shuttle drive gears 228 and 230 constantly are demeshing and remeshing, there is an inherent noise factor in the gear system and a backlash factor each time one of the gears demeshes. To minimize these two inherent disadvantages, it is preferable that the shuttle driving gears 228 and 230 be constructed of a resilient material, such as polyurethane, for the use of a resilient material substantially reduces the noise and gear wear and the gear wear caused by the backlash is reduced by the bending of the individual gear teeth of the resilient driving gears.

A description of a bead-wrapping cycle of machine 20 will now be given. In particular, reference is made to FIGS. 14 through 21 which depict the sequential steps of the bead wrapping and feeding operations.

The operator places the tire bead B to be wrapped on the bead table 44 (FIGS. 1 and 2) and presses the dual start buttons 220, supported on the upper forward end of an angle bracket 221. Dual start buttons are preferred as a safety feature because they require the use of both hands of the operator. Piston and cylinder unit 54 is energized to retract piston 60 and advance the table 44 towards the shuttle assembly until the bead is clamped between the bead drive and follower rollers 72 and 74. The bead B is then located in the shuttle throat 80, as depicted in FIG. 14. Full advance of table 44 starts the shuttle drive and a conventional counter housed in the cabinet 22 computes the shuttle revolutions. This counter counts shuttle revolutions thus assuring sufficient revolutions of the bead drive rolls to pass the required length of bead through the shuttle throat. A proximity switch is used for determining proper shuttle location to shut down the drive and apply the air brake to properly position shuttle slot to allow bead removal. The counter and proximity switch could be any of a number of well known, commercially available components used in bead wrapping machines.

FIG. 14 illustrates the relative position of the machine parts after the bead B has been transported into the center of ths shuttle assembly 34, but prior to the start of the driving of the shuttle gear 76. In this position the shuttle gear 76 is stopped with the gear's throat 80 oriented to receive the tire bead and with the end of cord C advanced by the feed fingers 184 to a cord feeding position at a location adjacent one side of shuttle gear 76.

In FIG. 15, the shuttle gear 76 has turned through an approximate 135 degree angle in a counter-clockwise direction. Bobbin 83 acting as a take-up means, has picked up the cord C and is pulling the cord from the stationary cord spool through the various cord guides.

FIG. 16 illustrates the shuttle assembly 34 after the shuttle gear 76 has completed one counter-clockwise revolution. The cord C is now being accumulated around all three bobbins 81–83 of accumulator assembly 36, and an initial wrap is being formed about the bead B. The bead drive rollers 74 are advancing the bead B from approximately 5/8 inch to 2½ inches per shuttle revolution depending on the wrap spacing selected. As the cord tensioner 84 passes through one complete revolution, the cord C is drawn into the spring-loaded jaws 85–86 to thereafter maintain wrap tension in the cord.

FIG. 17 shows the condition after the occurrence of several shuttle revolutions. Note that the advance of the bead B has pulled the cord end out of the grip of the fingers 184 and that the cord is being accumulated about the three bobbins due to the fact that the wrap circumference is much smaller than the distance around the bobbins. This accumulation ratio varies with bead cross-section but is in the range of 10 to 1, i.e., one shuttle revolution accumulates a sufficient amount of cord to provide ten wraps about the bead.

FIG. 18 represents the completion of approximately 10 percent of the total shuttle revolutions required to wrap the bead. Having sufficient cord accumulated to finish wrapping the bead, the cord cutting assembly 42 is energized and severs the cord in the manner previously described. The cord tension pads 150 continue to hold the free end coming from the cord spool for the next wrapping cycle. Since no further cord is being supplied to the accumulators, the cord wrapped about the tire beads is thereafter withdrawn from the accumulator bobbins 81–83.

FIG. 19 illustrates the last remaining portion of the cord being fed through the cord tensioner 84 and wrapped around tire bead B. In practice, a short cord length remains extending from the bead which is subsequently rolled into the bead.

FIG. 20 illustrates the condition immediately after the completion of the wrapping with the shuttle gear 76 stopped in the normal position and the bead B being removed. At this time, the cord feed assembly 40 is energized to retract the feed fingers 184 to the cord holding position adjacent the cord tension pads 150 where the fingers 184 are open and about to grip the cord end.

In FIG. 21, the cord feed assembly 40 has extended the feed fingers 184 into the throat area to again position the cord end for the next wrapping operation.

We claim:

1. In a bead wrapping machine having a feed table assembly for inserting the beads to be wrapped into the open throat of a shuttle, bead driving means for moving the entire length of the bead crosswise through the center of said shuttle during one bead wrapping cycle, and shuttle driving means to rotate said shuttle, an improvement comprising a spool holder mounted remote from said shuttle for supporting a spool of cord, cord feeding assembly having gripping means for holding the end of the cord at a cord feeding position adjacent one side of said shuttle, accumulator assembly carried on said one side of said shuttle including take-up means for intercepting the cord extending between said gripping means and said spool holder and including accumulator means for storing excess cord as said shuttle rotates about said bead, cord cutting assembly including cutter means for severing the cord extending from said spool after a predetermined length of cord to wrap the beads is unwound from the spool and including tensioning means for holding the end of the cord coming from the spool after it has been severed, and where cord feeding assembly includes power means to move said gripping means between said cord feeding position and a cord holding position adjacent said tensioning means after said cord has been severed and actuating means automatically opening and closing said gripping means at said cord holding position for gripping the end of the cord and said power means conveys said gripping means back to said end feeding position to be ready for the next bead wrapping cycle.

2. The improvement in a bead wrapping machine as defined in claim 1, wherein said accumulator assembly comprises a plurality of bobbins rotatably supported in a spaced relation on said one side of said shuttle, and a cord tensioning device mounted at the base of one of said bobbins including a pair of spring biased jaws disposed radially inwardly of said shuttle through which the cord is automatically introduced and is fed through as it wraps about the bead.

3. The improvement in a bead wrapping machine as defined in claim 1, wherein said cord feeding assembly further comprises a stationary base member mounted on the bead wrapping machine, a slide unit movably mounted on said base member, wherein said gripping means comprises a pair of gripping fingers pivotally mounted on said slide unit, pin means for opening and closing said gripping fingers, and spring means for normally biasing said fingers in the closed position, and wherein as said power means moves said slide unit from said cord feeding position to said cord holding position, said actuating means automatically opens and closes said pair of gripping fingers to grip the free end of the cord.

4. The improvement in a bead wrapping machine as defined in claim 3, wherein said actuating means comprises a lever pivotally mounted on said slide unit with its mid-portion disposed to engage said pin means, and a cam on said base member having a cam surface disposed in the path of the free end of said lever and adapted to be engaged by said free end as said slide unit moves said gripping fingers to said cord holding position such that as said free end rides along said cam surface said mid-portion of said lever will push said pin means in a direction to open said gripping fingers and hold them open until said free end passes beyond said cam surface.

5. The improvement in a bead wrapping machine as defined in claim 1, wherein said cutter means of said cord cutting assembly comprises a pair of elongated cutter members slidably mounted through a housing and having at one end opposing blade edges facing each other and spread apart in a non-cutting position such that the cord extending from the spool to the gripping means passes therethrough, a rotatable actuating means for conjointly moving said cutter members in opposite directions to cause said blade edges to cross and sever the cord, and drive means to reciprocably turn said rotatable actuating means to open and close said cutter members.

6. The improvement in a bead wrapping machine as defined in claim 5, wherein said rotatable actuating means comprises a triangular plate pivotally supported at its center carrying two pivot pins at two of its corners and a drive pin at its third corner, and wherein recesses formed in the other end of said cutter members engage each of said two pivot pins to reciprocably drive said cutter member in response to turning said triangular plate.

7. In a bead wrapping machine having a feed table assembly for inserting the beads to be wrapped into the open throat of a shuttle, bead driving means for moving the entire length of the bead crosswise through the center of said shuttle during one bead wrapping cycle, and shuttle driving means to rotate said shuttle, an improvement comprising a spool holder mounted remote from said shuttle for supporting a spool of cord, gripping means for holding the end of the cord at a cord feeding position adjacent one side of said shuttle, take-up means for intercepting the cord extending between said gripping means and said spool holder, accumulator means for storing excess cord as said shuttle rotates about said bead, cutter means for severing the cord extending from said spool after a predetermined length of cord to wrap the beads is unwound from the spool, tensioning means disposed between said cutter means and said spool for holding the end of the cord extending from the spool after the end is severed, means for moving said gripping means at the end of each bead wrapping cycle to a cord holding position adjacent said tensioning means and back to said cord feeding position, and actuating means for automatically opening and closing said gripping means for gripping the end of the cord at said cord holding position.

8. The improvement in a bead wrapping machine as defined in claim 7, wherein said accumulator means comprises a plurality of bobbins rotatably supported in a spaced relation on said one side of said shuttle.

9. The improvement in a bead wrapping machine as defined in claim 8, further comprising a cord tensioning device mounted at the base of one of said bobbins including a pair of jaws disposed radially inwardly of said shuttle through which the cord is automatically introduced and fed as it wraps about the bead and spring means for keeping said jaws under constant tension.

10. The improvement in a bead wrapping machine as defined in claim 7, wherein said means for moving said gripping means comprises a stationary base member supported on the bead wrapping machine, a slide unit movably mounted on said base member, and power means for moving said slide unit between said cord feeding position and said cord holding position, and wherein said gripping means is carried by said slide unit.

11. The improvement in a bead wrapping machine as defined in claim 10, wherein said gripping means comprises a pair of gripping fingers pivotally mounted on said slide unit, pin means for opening and closing said gripping fingers, and spring means for normally biasing said fingers in the closed position, and wherein as said power means moves said slide unit from said cord feeding position to said cord holding position said actuating means automatically opens and closes said pair of gripping fingers to grip the end of the cord.

12. The improvement in a bead wrapping machine as defined in claim 11, wherein said actuating means comprises a lever pivotally mounted on said slide unit with its mid-portion disposed to engage said pin means, and a cam on said base member having a cam surface disposed in the path of the free end of said lever and adapted to be engaged by said free end as said slide unit moves said gripping fingers to said cord holding position such that as said free end rides along said cam surface said mid-portion of said lever will push said pin means in a direction to open said gripping fingers and hold them open until said free end passes beyond said cam surface.

13. The improvement in a bead wrapping machine as defined in claim 7, wherein said cutter means comprises a pair of elongated cutter members slidably mounted through a housing and having at one end opposing blade edges facing each other, and spread apart in a non-cutting position such that the cord extending from the spool to the gripping means passes therethrough, a rotatable actuating means for conjointly moving said cutter members in opposite directions to cause said blade edges to cross and sever the cord, and drive means to reciprocably turn said rotatable actuating means to open and close said cutter members.

14. The improvement in a bead wrapping machine as defined in claim 13, wherein said rotatable actuating means comprises a triangular plate pivotally supported at its center carrying two pivot pins at two of its corners and a drive pin at its third corner, and wherein recesses formed in the other end of said cutter members engage each of said two pivot pins to reciprocably drive said cutter member in response to turning said triangular plate.

References Cited
UNITED STATES PATENTS

| | | | |
|---|---|---|---|
| 1,246,260 | 11/1917 | Goodwin | 242—413 |
| 3,383,059 | 5/1968 | Fahrbach | 242—4 B |
| 2,974,890 | 3/1961 | Davis | 242—4 B |

ROBERT F. BURNETT, Primary Examiner

C. B. COSBY, Assistant Examiner

U.S. Cl. X.R.

156—172, 189, 185, 422, 458; 242—4 B, 4 BE